United States Patent
Drinkard, Jr.

[11] 3,911,246
[45] Oct. 7, 1975

[54] ELECTRODE ASSEMBLY FOR A RESISTANCE SOLDERING UNIT

[76] Inventor: John H. Drinkard, Jr., 122 N. Valley Road, Exton, Pa. 19341

[22] Filed: Jan. 17, 1974

[21] Appl. No.: 434,071

[52] U.S. Cl. .............. 219/234; 219/69 E; 219/85; 219/119; 228/54
[51] Int. Cl.² ... H05B 1/00; B23K 1/02; B23K 3/02; B23K 11/30
[58] Field of Search ............ 219/234, 85, 119, 69 E, 219/85 CA, 85 CM; 228/51–55

[56] References Cited
UNITED STATES PATENTS

| | | | |
|---|---|---|---|
| 1,893,093 | 1/1933 | Linville et al. | 219/234 X |
| 2,689,901 | 9/1954 | Obolensky | 219/234 X |
| 2,692,935 | 10/1954 | Pearce et al. | 219/234 X |
| 2,797,303 | 6/1957 | Kershaw | 219/234 UX |
| 3,089,020 | 5/1963 | Hurlebaus | 219/234 UX |

FOREIGN PATENTS OR APPLICATIONS 632,132 | 11/1949 | United Kingdom | 219/234

*Primary Examiner*—A. Bartis

[57] ABSTRACT

A solder tip electrode for a resistance solder unit for use in soldering fine-wire-wrap pins to a backplane structure of a computer is provided utilizing a carbon electrode of cylindrical shape having an insulated inner surface. The electrode may be fabricated from a single piece of carbon material either by machining or by molding. Preferably the carbon is a high density impregnated and purified grade having substantially a score scope hardness of 70, and a density of 1.88 gms/cc, with impurity of less than 5 parts per million and a particle size of less than .001 inches. A base portion being intended for insertion into a resistance power unit is preferably of larger outer diameter than needed at the soldering end. Typically, the outer diameter of the electrode will be necked-down from the larger base diameter to a small shank diameter at a distance from the soldering end or tip. A shank portion may be formed by this small outside diameter which extends to the soldering tip. The tip may be formed by a truncation of the shank. The same inside diameter of the electrode may be continued in the base and shank portions with a smaller inside diameter extending through the tip. Preferably, an insulating material may extend along the inner surface of the base and shank portion.

2 Claims, 1 Drawing Figure

U.S. Patent Oct. 7,1975 3,911,246
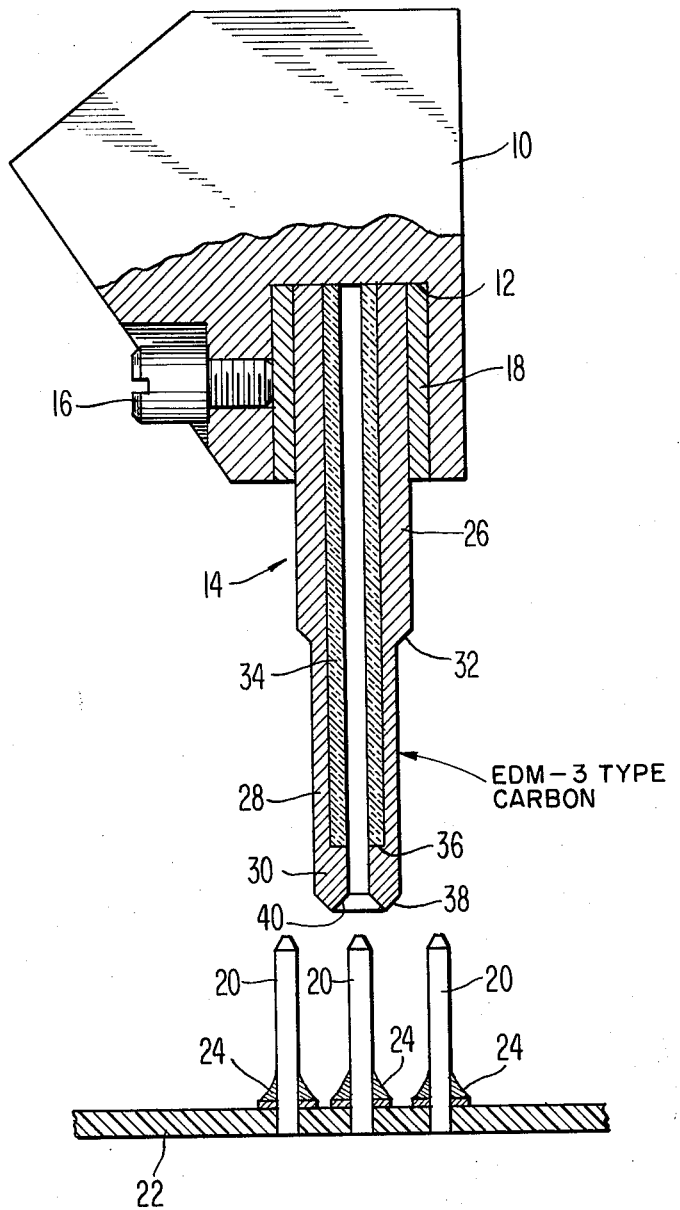

ELECTRODE ASSEMBLY FOR A RESISTANCE SOLDERING UNIT

BACKGROUND OF THE INVENTION

Computer backplanes have evolved as a structure for facilitating signal interconnections between the computer components and printed circuit cards or boards. In that the computer's electronic structure is fragmented into a plurality of such circuit cards, apparatus for use in making secure and orderly signal interconnections between printed circuit cards has evolved into the computer backplane.

A typical backplane will include a planar surface on which is mounted a plurality of fine pins or wire wrap terminals. Signal wires coming from printed circuit card connectors are connected to selected pins via wire wrap technique. Signal wires connecting the desired destination for these signals are then wrapped to the same pin thus making a positive and secure connection. In this manner, for example, card A, pin 1, may be connected to card B, pin 2 via a terminal pin on the backplane.

Typically, the backplane is constructed by soldering voltage or ground pins to the base or planar surface. This is accomplished by inserting pins into drilled holes in the planar surface and soldering the pin to this surface at the base of the pin.

A standard soldering iron having a resistance heating element in the unit and having a copper heat transfer tip used to melt the solder has been most commonly used in the industry. Often a hole is drilled longitudinally through the copper tip so that the tip may be placed over each pin when soldering.

When the backplane pins must be soldered closely together, various problems occur in using this standard apparatus. The copper tip, since it depends upon the heat transfer coefficient and copper mass for the delivery of a desired quantitiy of heat at the tip, is often too thick to be inserted between closely spaced pins. Secondly, and most importantly, copper or other metal tips pick up solder, thus when these tips are lifted off the pins they have a tendency to spread solder along the pins which deters a gas tight connection in wire wrapping. In addition, this method is very slow compared to carbon electrode contact resistance soldering.

An object of this invention is to provide a soldering tip which may be small enough to be inserted between closely packed pins while still delivering sufficient heat to adequately melt solder.

An additional object of this invention is to provide a soldering tip which will not pick up solder when removed from the soldering position.

SUMMARY OF THE INVENTION

The objectives of this invention are accomplished in an electrode solder tip, preferably fabricated from a mass of electrically conductive material such as carbon which may be of sufficient structural hardness such as carbon EDM-3 in a cylindrical or tubular shape. Type EDM-3 carbon is manufactured by Poco Graphite Inc., Decator, Tex. as a high density impregnated purified carbon, having a score scope hardness of 70 and a density of 1.88 gms/cc with impurity of 5 parts per million or less and a particle size of less than 0.001 inches.

A tubular base portion should be of sufficient thickness to provide support for the rest of the electrode structure and may comprise a large part of the electrode. The inside diameter of this base may be sufficiently large to allow for an adequate thickness of insulating material.

A tubular shank portion may be formed by continuation of the base but with a reduction of the outer diameter. This reduction may be formed by tapering the larger base diameter to a smaller shank diameter. A fillet may exist where the taper becomes the shank outer diameter. Typically, the shank outer diameter can be equal to the distance between backplane pin centers. The shank length should be sufficiently greater than pin length so as to allow "seeing" clearance in a soldering operation and an electrical capacitive clearance of the base to surrounding pins. The inside surface of the shank may be a continuation of the base with similar diameter dimension.

A tubular tip portion may be formed by a continuation of the outside diameter of the shank. However, the inside diameter of the tip may be smaller than that of the shank but larger than the diameter of a pin to be soldered. This transition of the inside diameters may form a shoulder concentric with electrode features. The extreme or soldering end of the tip may be chamfered and counter sunk.

A thermal and electrical insulating material may be applied to the inside surface of the base and shank portions. Typically, this may take the form of a cylindrical or tubular insulator inserted from the base end and butted against the shoulder. This insulator should have an inside diameter similar to that of the tip.

DESCRIPTION OF THE DRAWINGS

The features of this invention will become more fully apparent from the following detailed description, attached claims and accompanying DRAWINGS in which like characters refer to like parts, and in which:

The sole FIGURE of the drawing shows a cross section of the electrode as installed in a resistance power unit positioned over a backplane pin.

DETAILED DESCRIPTION OF THE INVENTION

The electrode soldering tip is provided for use in an electrical resistance soldering unit of the type supplied by Ideal Industries, Model No. 12–163. Such a unit 10, FIG. 1, has an electrically hot circular socket 12 into which a round electrode 14 is inserted. Electrode 14 is preferably of EDM-3 type carbon as manufactured by Poco Graphite Inc., Decator, Tex., a high density impregnated and purified carbon, grade DFP—3-2, score scope hardness 70, density 1.88 gms/cc, impurity less than 5 parts per million, and particle size less than 0.001 inches. A set screw 16 is positioned to operate through the sidewall of the socket to hold an inserted electrode 14 in position.

In cases where the diameter of the electrode 14 is considerably smaller than the diameter of the socket 12 a collet 18 is first inserted into the socket 12 to fill the excess space. This collet 18 can take the form of copper sleeve, having a 0.31 inch inside diameter and being 0.5 inches long.

The exact dimensions of electrode 14 will vary depending upon the size pins to be soldered. Typically, square wire-wrap pins 20, 0.31 inches long and 0.062 inches on a side, are soldered on 0.25 inch centers so that they will extend perpendicularly from the surface of board 22. A quantity of solder material 24 is built up around each pin base to secure each pin 20 to the board 22.

The electrode 14 includes a base 26, a shank 28, and a tip 30 formed from a single mass of carbon and an insertable insulator 32.

The base 26 forms the support structure for the rest of the electrode 14 and is the part of the electrode 14 mounted in the socket 12. Base 26 is cylindrical or tubular in shape being one inch long and having a uniform 0.312 inch outer diameter and a uniform 0.161 inch inner diameter or base concentric with the longitudinal centerline of the electrode 14.

The shank 28 end of base 26 tapers down to a smaller diameter to form the shank 28. This taper 32 occurs at a 45° angle from the outer surface of the base 26 and ends with a 0.06 inch radius of fillet 34.

Shank 28 is formed by the extension of base 26 from the fillet 34. Shank 28 is therefore also cylindrical in shape being 0.75 inches long and having a uniform 0.250 inch outer diameter and a uniform 0.161 inch inner diameter or base concentric with the longitudinal centerline of the electrode 14.

Tip 30 is formed by a cylindrical extension of the shank 28 at the same outer diameter as the shank 28. Tip 30, however, has a smaller inner diameter or bore than the shank 28. This increment in inner diameters forms a shoulder 36 which delineates the shank 28 from the tip 30. Tip 30 is 0.09 inches long and has a uniform 0.250 inch outer diameter and a 0.070 inner diameter concentric with the longitudinal centerline of the electrode 14.

The extreme end or soldering end of tip 30 has a 45° chamfer 38 cut to a 0.180 inch diameter and is counter sunk 40 at 90° to a 0.140 inch diameter.

Insulator 32 is a uniform porcelain tube or cylinder which is 1.75 inches long and which has a 0.161 inch outer diameter and a 0.070 inner diameter.

The type of carbon used in the electrode is very important. Since the carbon part of the electrode may be made by machining or molding, the carbon specification has little effect on the manufacturing process. However, when in use, the electrode must hold up under operational stresses. Soft carbon electrodes have the tendency of breaking very quickly. Since carbon prices are very high, it is important that the amount of carbon used in each electrode be held to a minimum. With this constraint, the type of carbon used must be of sufficient hardness to give adequate service. A grade of carbon such as EDM–3 is of sufficient hardness to give adequate service.

While the dimensions in length for the features of electrode 14 are not critical, specific tolerances should be adhered to for inner diameter dimensions. The bore diameter tolerance in the base 26 and shank 28 should be −.000, +.002 inches, while the bore diameter tolerance in the tip 30 and in the insulator 32 should be −.000, +.002 inches.

The porcelain insulator 32 electrically and thermally insulates the pin 20 from the electrically conductive carbon portion of the electrode. The current flow and therefore the soldering heat is directed to the end of the tip 30. While most of the heat is concentrated at the tip 30 a sufficient amount of heat conducts to the shank 28 and base 26 portions of the electrode 14. This heat is high enough to "burn" or oxidize the surface of a pin 20 if the hot shank 28 and base 26 were to come in contact with it. In some cases a pin 20 may be warped by this heat. If either of these conditions occurs, the particular pin 20 would be useless for wire-wrapping.

A soldering operation takes place by lowering the electrode 14 over a pin 20 with a quantity of solder positioned at the base of the pin 20. The board 22 is grounded and a charge which has been generated in the power unit 10 flows through electrode 14 to board 20. The gap resistance between electrode 14 and board 22 generates the solder melting heat. The counter sink 40 in the end of tip 30 aids in forming a solder buildup 24 at the base of a pin 20.

Many changes could be made in the above described apparatus without departing from the scope thereof. It is therefore intended that all matter contained in the above description be interpreted as illustrative and not in the limiting sense.

What is claimed is:

1. An electrode assembly for a resistance soldering unit for use in soldering fine pins to a backplane structure of a computer, comprising:

a hollow open-ended cylindrical electrode of carbon having substantially a scope score hardness of 70 and a density of 1.88 grms/cm with impurity of 5 parts per million or less and particle size of less than 0.001 inches, said electrode including a tip portion, a shank portion extending from said tip portion, a base portion extending from said shank portion, said base portion being of greater outer diameter than said shank and tip portions, the hollow of said electrode comprising a multi-diameter cylindrical cavity coaxially formed in said electrode tip, shank and base portions whereby the inside diameter of said base and shank portions is greater than the inside diameter of said tip portion, said tip portion being adapted to receive a pin to be soldered;

collet means interposing said base portion and the soldering unit for securing said base portion to the soldering unit and for providing an electrical path therebetween; and a hollow open-ended cylindrical insulator inserted coextensively in the cavity in said base and shank portions, said insulator having a cylindrical cavity coaxially formed therein substantially equal in diameter to the inside diameter of said tip portion.

2. The apparatus of claim 1 wherein the end of said tip portion is tapered and the tip cavity is countersunk at substantially 90° to the taper.

* * * * *

UNITED STATES PATENT OFFICE
CERTIFICATE OF CORRECTION

Patent No. 3,911,246    Dated October 7, 1975

Inventor(s) John H. Drinkard, Jr.

It is certified that error appears in the above-identified patent and that said Letters Patent are hereby corrected as shown below:

Title/Abstract page insert:

-- Assignee: BURROUGHS CORPORATION, Detroit, Michigan --; and

-- Attorney, Agent or Firm -- Leonard C. Brenner, Edward J. Feeney, Jr.; Kevin R. Peterson --.

Signed and Sealed this ninth Day of March 1976

[SEAL]

Attest:

RUTH C. MASON
Attesting Officer

C. MARSHALL DANN
Commissioner of Patents and Trademarks